May 14, 1963  M. C. ADDICKS  3,089,662
CLUTCH FOR AUTOMATIC SHOVELING MACHINES AND THE LIKE
Original Filed Aug. 9, 1954  2 Sheets-Sheet 1
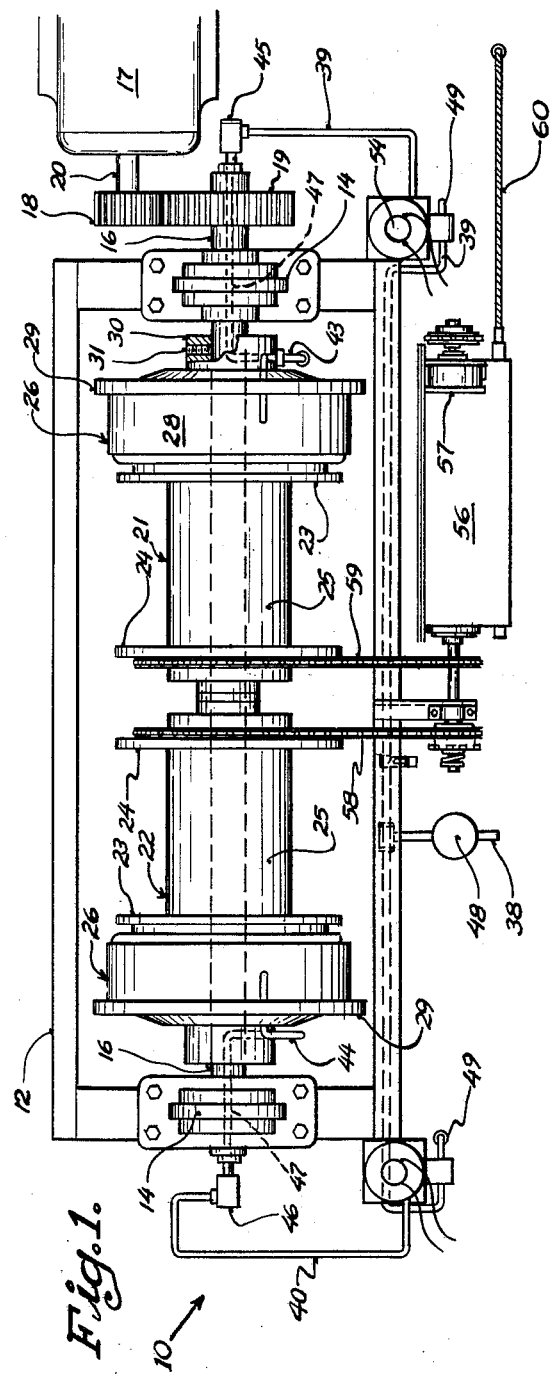
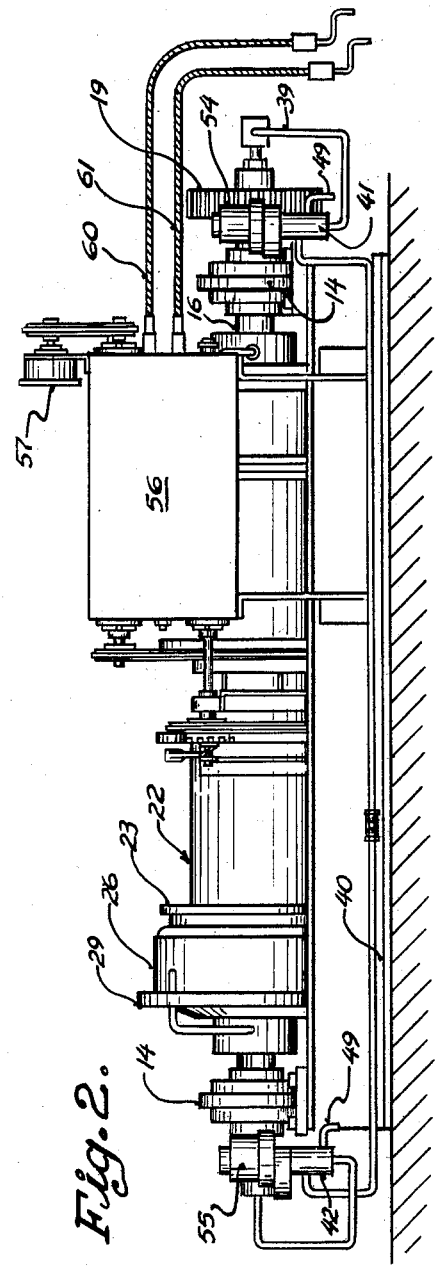
INVENTOR.
Mentor C. Addicks
BY
Whiteley and Caine
ATTORNEYS May 14, 1963 M. C. ADDICKS 3,089,662
CLUTCH FOR AUTOMATIC SHOVELING MACHINES AND THE LIKE
Original Filed Aug. 9, 1954 2 Sheets-Sheet 2
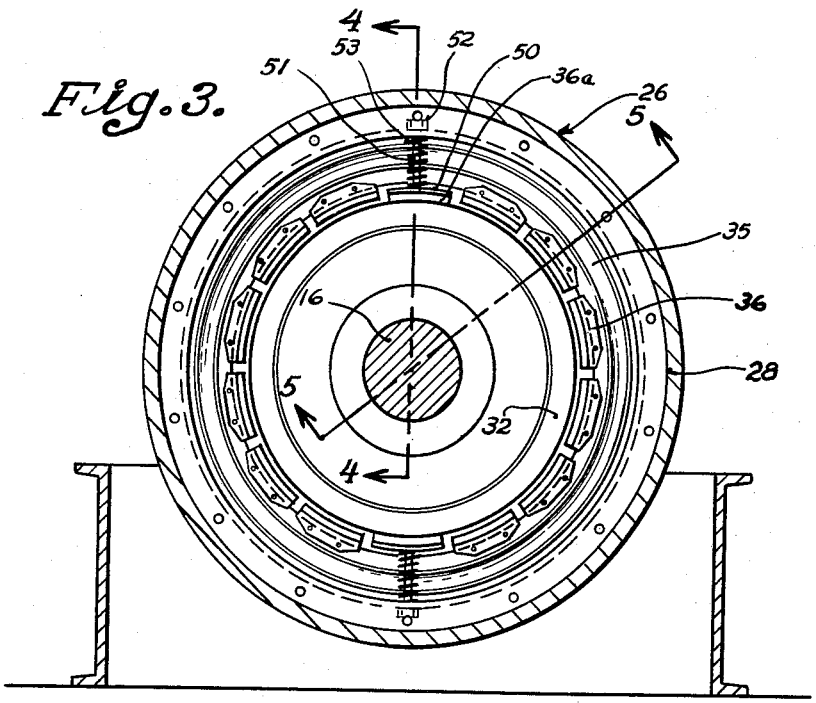
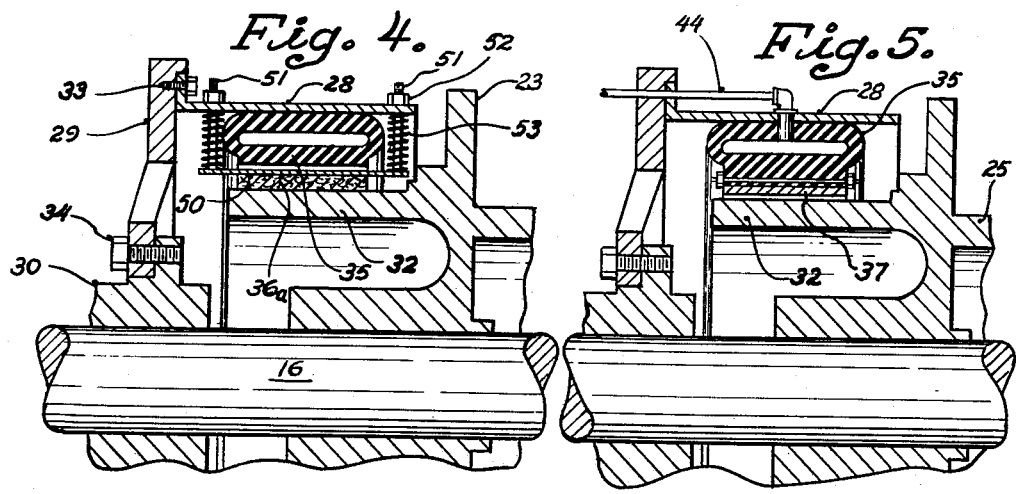
INVENTOR.
Mentor C. Addicks
BY
Whiteley and Caine
ATTORNEYS United States Patent Office 3,089,662
Patented May 14, 1963

3,089,662
CLUTCH FOR AUTOMATIC SHOVELING
MACHINES AND THE LIKE
Mentor C. Addicks, 5107 Arden Ave., Minneapolis, Minn.
Original application Aug. 9, 1954, Ser. No. 448,696, now Patent No. 2,924,675, dated Feb. 9, 1960. Divided and this application Feb. 5, 1960, Ser. No. 6,970
5 Claims. (Cl. 242—75.5)

This invention relates to improvements in a clutch mechanism. In general, the invention is concerned with a power operated shoveling machine that finds utility in moving bulk materials, such as grain or mining products, although the invention will have utility in other fields embodying the use of a cable winding machine.

This application is a division of my co-pending application Ser. No. 448,696, now Patent 2,924,675.

In the field of cable winding machines, the cable winding drum is releasably joined to a power source by a high torque clutch for cable winding purposes; but in paying out the cable from such an arrangement, it is important to provide a low torque clutch between the driving and driven members to prevent the backlash of the piling up of cable. In my prior patents Re. 24,122 and 24,210, I disclosed two different forms of clutch arrangements for providing the low and high torque couplings between a driving member and a driven member. In these prior arrangements, the low and high torque couplings are separated from each other, and therefore, involve two independent forms of structure, and consequently increase the cost of production.

In the present arrangement, the two clutches are combined in one assembly to provide a structure, wherein for low torque purposes a constant coupling force exists between the two members, and for high torque purposes, the coupling force between the same members is merely increased. This arrangement reduces the number of parts, and improves the design of the structure by requiring the use of fewer parts.

An object of the invention is to provide in a cable winding machine a combined low and high torque clutch for connection between the driving and the driven members.

Another object is to provide a combined low and high torque clutch for use in a cable winding machine wherein a continuous low torque transfer force is directed between defined portions of a driving and driven member, and a high torque coupling force is obtained by merely increasing the coupling force at the same place between the same members.

A further object is to provide in a cable winding machine, embodying concentrically arranged driving and driven members, a clutch composed of a multiplicity of shoes carried by one of the members for engaging the other members, wherein some of the shoes are adjustably biased into constant engaging contact, and all of the shoes may be brought into full engagement by the uniform application of force to all of the shoes.

Other and further objects may become apparent from the following specification and claims, and in the appended drawings in which:

FIG. 1 is a plan view of one form of cable winding machine to which the present invention is applicable;

FIG. 2 is a side elevation of the structure shown in FIG. 1;

FIG. 3 is a section taken through a part of one of the drums shown in FIG. 1;

FIG. 4 is a section taken on the lines 4—4 of FIG. 3; and,

FIG. 5 is a section taken on the lines 5—5 of FIG. 3.

Referring now to the several views of the drawings, the invention will be described in detail.

Referring first to FIGS. 1 and 2, general reference numeral 10 indicates a two-drum unit of a cable winding machine, which as is disclosed in Patent 2,924,675, is utilized for unloading grain or other aggregate from a container, such as a railway freight car. Reference character 12 indicates a base structure on which is mounted aligned bearings 14 that journal a drive shaft 16, which is driven by a motor 17 through speed reducing gears 18 and 19. The gear 18 is fixed on the shaft 20 of the motor 17, whereas the gear 19 is rigidly secured to the shaft 16. A cable, not shown, has one of its ends secured to a cable winding drum 21 that is journaled on the drive shaft 16, and the opposite end of said cable has its free end secured to a second drum 22, also journaled on the shaft 16 in axially spaced relationship to the winding drum 21. The drums 21 and 22 are in the nature of spools, each having radially outwardly projecting circumferential cable confining flanges 23 and 24, and relatively smooth cylindrical cable engaging surfaces 25 over which the opposite ends of the cable are respectively wound. The opposite ends of the cable are wound on the respective drums 21 and 22 in the same direction of rotation, since one drum constitutes a pull-forward drum for the cable, and the other drum constitutes a pull-back drum for said cable.

The drums 21 and 22 are each operatively coupled to the drive shaft 16 by clutch mechanisms indicated in their entirety by general reference numeral 26, and which are shown in greater detail in FIGS. 3, 4 and 5. Referring to the latter figures, the clutch mechanism comprises a driven element in the nature of a cylindrical casing 28 mounted in concentric relationship to the shaft 16 by means of an angular flange 29, and a hub section 30, which is pinned or otherwise rigidly secured to the drive shaft 16, as indicated at 31 in FIG. 1; and a driven element 32 in the nature of an axially outwardly extending cylindrical portion integrally formed with its respective winding drum and concentric with the casing member 28, see particularly FIGS. 4 and 5. The casing member 28 is rigidly secured to the flange 29 by screws or the like 33, and the flange 29 is anchored to the hub 30 by bolts 34. The casing member 28 carries an annular flexible tube 35 which is adapted to be inflated and deflated so as to expand and contract. The tube 35 carries a plurality of circumferentially spaced shoes 36, each of which is provided with a lining 37 that is adapted to engage the outer cylindrical wall surface of the element 32 upon introduction of fluid under pressure to the interior of the tube 35, whereby to frictionally lock the drum to the drive shaft 16 for common rotation therewith. The annular flexible tube 35 is of such characteristics that, in its normal state, it will support the shoes 36 and linings 37 thereof out of frictional engagement with the element 32 until fluid under pressure is introduced into the interior of the tube 35.

Fluid, preferably air under pressure, is admitted selectively through the interiors of the flexible tubular elements 35 from a source of fluid pressure, not shown, through conduit means including a pipe or tube 38, branch tubes 39 and 40, in which are interposed actuators in the nature of solenoid operated valves 41 and 42. The branch conduits 39 and 40 terminate in fittings 45 and 46, each of which is coupled to the opposite ends of the drive shaft 16, and communicate with internal passages 47 in the shaft, which passages communicate by short tubes 43 and 44 with the interior of the expansible units 35. If desired, a pressure regulator 48 may be interposed in the delivery line 38 to measure the fluid pressure. The valves 41 and 42 are in the nature of three-way valves, and are adapted to be operated in such a manner that, when it is desired to inflate the member 35, air is admitted thereto when the valves 41 and 42 are actuated, and when said valves are de-actuated, the air flows to atmosphere through an escape conduit 49.

As seen in FIGS. 3 and 4, the low torque transfer coupling comprises one or more driving shoes 36a, which are generally similar to the shoes 36, except that a lower plate 50 that carries the frictional lining 37, extends laterally beyond the lining and is joined to the casing 28 by studs 51 carrying adjustable nuts 52. Compression coil springs 53 extend between the plate 50 and casing 28, and the tension on these springs is adjusted by the nuts 52. As disclosed in FIG. 3, there are two diametrically opposed shoes 36a, but the number of these adjustable shoes can be increased to give the desired low torque coupling force required for a particular application, and therefore, if desired, all of the shoes could be similar to the shoes 36a and their accompanying parts.

The actuator valves 41 and 42 are electrically controlled by solenoids 54 and 55 through electrical circuits which are controlled by certain switches, not shown, contained within a casing 56, and an additional switch 57 that is mounted on the casing. The several switches are in part controlled by chain drives 58 and 59, and by manually operated cables 60, 61. The subject matter of control is fully described and claimed in my aforesaid Patent 2,924,675.

The operation of the invention will now be described. For certain applications, it is only necessary to utilize a single cable winding drum, such for example, as when the cable is paid out by a manual operation; and two cable winding drums are ordinarily used in combination with each other for an automatic operation wherein one of the drums serves to pay the cable out, as for example, in an automatic shoveling operation, and the other drum serves to return the cable. In either instance, the free end of a cable is secured to a drum, and with the shaft 16 in rotation, the drum tends to wind the cable thereon by virtue of the low torque transfer coupling obtained by the frictional contact of the shoes 36a under the bias of the coil spring 53 working against the casing portion 28 under adjustment of the nuts 52 of the bolts 51. The low torque coupling is not sufficient to prevent cable from being payed out, and in those circumstances is rotated in an opposite direction, despite the coupling force of the shoes 36a. When, however, under the influence of the controls in containers 56 and 57, one or the other of valves 54, 55, are actuated, the pressurized fluid flows into the expansible member 35, causing said member to expand and increase the coupling force of the shoes 36a, as well as moving the remaining shoes 36 into frictional contact with member 32 to form a high torque coupling force.

The principal advantage of the present invention resides in the provision of means forming a constant coupling force between a driving member and a driven member, which can be increased through additional force applied to the same means.

Another advantage resides in the fact that since at least some of the same elements which form the high torque coupling force, as well as the low torque coupling force, the extent of the latter can be easily modified without necessitating any change in the machine.

Another advantage is that the cost of providing the dual coupling from a common set of elements, the cost of construction can be reduced while gaining additional flexibility in control.

My invention is defined in the terms of the appended claims.

I claim:

1. In a cable winding machine, embodying a cable winding member journaled for rotatable movement, a rotary driving member, one of said members circumscribing the other member, coupling means carried by one of said members and rotatable therewith coacting between said members for establishing a low torque coupling force between said members, means for adjusting said low torque coupling force sufficient to inhibit relative movement between said members during the paying out of cable under conditions which are subject to variation in torque requirements, and releasable means also carried by one of said members and rotatable therewith coacting directly with said last named means and in a direction opposite to the adjustment thereof to substantially increase the coupling force between said members during the winding of cable.

2. In a cable winding machine, embodying a cable winding member journaled for rotatable movement, a rotary driving member, one of said members circumscribing the other member, a multiplicity of frictional shoes carried by one of said members adapted to frictionally engage the other member, two diametrically opposed shoes normally biased into frictional engagement with one of said members by a force sufficient to form a low torque coupling force to hold a cable taut during the paying out of said cable, and releasable fluid pressure means adapted to engage all of said shoes and force them uniformly in contact with one of said members to form a high torque coupling force for cable winding purposes.

3. In a cable winding machine, embodying a cable winding member journaled for rotatable movement, a rotary driving member, one of said members circumscribing the other member, a multiplicity of frictional shoes carried by one of said members adapted to frictionally engage the other member, a diametrically opposed pair of said shoes normally biased into frictional engagement with one of said members, means for selectively changing said bias to form a sufficient low torque coupling force between said members to hold a cable taut during the paying out of said cable, and releasable fluid pressure means adapted to engage all of said shoes and force them uniformly in contact with one of said members to form a high torque coupling force between said members for cable winding purposes.

4. In a cable winding machine, embodying a cable winding member journaled for rotatable movement, a rotary driving member, one of said members circumscribing the other member, coupling means coacting between said members, comprising a flexible inflatable tube carried by one of said members and disposed between coacting faces of said members, a multiplicity of frictional shoes carried by one of said members on one side of said inflatable tube adapted to uniformly frictionally engage the other member when said tube is inflated to form a high torque coupling connection between said members, and means coacting with two diametrically opposed shoes normally biasing said opposed shoes into frictional engagement with the other member by a force sufficient to form a low torque coupling force between said members when said tube is uninflated, said cable winding member normally being rotated in a direction opposite to the low torque coupling force during the paying out of cable and being adapted by the low torque coupling force to fully rotate to take up slack in the cable.

5. In a cable winding machine, embodying a cable winding member journaled for rotatable movement, a rotary driving member, one of said members circumscribing the other member, coupling means coacting between said members, comprising a flexible inflatable tube carried by one of said members and disposed between coacting faces of said members, a multiplicity of frictional shoes carried by one of said members on one side of said inflatable tube adapted to uniformly frictionally engage the other member when said tube is inflated to form a high torque coupling connection between said members for cable winding purposes, a diametrically opposed pair of said shoes normally biased into frictional engagement with the other member when said tube is uninflated, and means for selectively changing said bias to form a low torque coupling force between said members of sufficient force to hold a cable taut during the paying out of said cable, said cable winding member normally being rotated in a direction opposite to the low torque coupling force during the paying out of cable and being adapted by the low toque coupling force to fully rotate when slack occurs in the cable to take up such slack.

References Cited in the file of this patent

UNITED STATES PATENTS

| | | |
|---|---|---|
| 1,509,504 | Doberstein | Sept. 23, 1924 |
| 2,246,978 | Kraft | June 24, 1941 |
| 2,259,527 | Manville | Oct. 21, 1941 |
| 2,657,852 | Spase | Nov. 3, 1953 |
| 2,695,697 | Stoeckicht | Nov. 30, 1954 |

FOREIGN PATENTS

German application S 47,242, printed Oct. 11, 1956 (K 7B 510).